US012588673B1

(12) United States Patent
Tharp et al.

(10) Patent No.: US 12,588,673 B1
(45) Date of Patent: Mar. 31, 2026

(54) FEEDING MOTION DUCK DECOY

(71) Applicant: Jahpoo Outdoors Ltd., Austin, TX (US)

(72) Inventors: Carson Ross Tharp, Austin, TX (US); Joseph William Conrad, Houston, TX (US); Jordan Franklin Reynolds, Houston, TX (US)

(73) Assignee: Jahpoo Outdoors Ltd., Austin, TX (US)

( * ) Notice: Subject to any disclaimer, the term of this patent is extended or adjusted under 35 U.S.C. 154(b) by 0 days.

(21) Appl. No.: 18/429,409

(22) Filed: Jan. 31, 2024

Related U.S. Application Data

(60) Provisional application No. 63/442,725, filed on Feb. 1, 2023.

(51) Int. Cl.
*A01M 31/06* (2006.01)

(52) U.S. Cl.
CPC .................................. *A01M 31/06* (2013.01)

(58) Field of Classification Search
CPC .................................................... A01M 31/06
See application file for complete search history.

(56) References Cited

U.S. PATENT DOCUMENTS

| | | | |
|---|---|---|---|
| 2,434,335 | A | 1/1948 | Signalness |
| 2,591,554 | A | 4/1952 | Kinney et al. |
| 2,849,823 | A | 9/1958 | Miller |
| 3,434,234 | A | 3/1969 | Schleter et al. |
| 4,322,908 | A | 4/1982 | McCrory |
| 5,377,439 | A | 1/1995 | Roos et al. |
| 6,088,944 | A | 7/2000 | Jones |
| 6,412,209 | B1 * | 7/2002 | Kapraly ................ A01M 31/06 43/3 |
| 6,412,210 | B1 | 7/2002 | Horrell |
| 6,684,552 | B1 | 2/2004 | Anders, III |
| 8,950,103 | B2 | 2/2015 | Bullerdick |
| 9,253,974 | B2 | 2/2016 | Baskfield et al. |
| 10,172,346 | B2 | 1/2019 | Fobian |
| 10,194,654 | B2 | 2/2019 | Hanson |
| 11,000,028 | B2 | 5/2021 | Campbell et al. |
| 11,033,020 | B2 * | 6/2021 | Latschaw .............. A01M 31/06 |
| 11,083,189 | B1 * | 8/2021 | Baskfield .............. A01M 31/06 |
| 11,224,214 | B2 | 1/2022 | Hanson |
| 11,716,988 | B2 | 8/2023 | Denmon |
| 2002/0178639 | A1 | 12/2002 | Daniels |
| 2004/0010957 | A1 | 1/2004 | Corbiere, Jr. |
| 2005/0160654 | A1 * | 7/2005 | Cosciani .............. A01M 31/06 43/2 |

(Continued)

OTHER PUBLICATIONS

"MOJO Elite Series King Mallard Spinning Wing Duck Decoy for Duck Hunting" [Retrieved Mar. 25, 2024] Retrieved from the Internet: <https://www.amazon.com/MOJO-Outdoors-Mallard-Spinning-Decoy/dp/B08ZJLYRY6?ref_=ast_sto_dp&th=1>.

(Continued)

*Primary Examiner* — Richard G Davis
(74) *Attorney, Agent, or Firm* — J. Roger Williams, Jr.

(57) ABSTRACT

A motion duck decoy, in which a duck decoy comprises a weight and a power source enclosed within the duck decoy, whereby powered motion of the weight within the duck decoy causes the duck decoy to mimic the feeding motion of a duck. The decoy may include a Scotch yoke mechanism.

10 Claims, 17 Drawing Sheets

(56)        References Cited

U.S. PATENT DOCUMENTS

| | | |
|---|---|---|
| 2006/0207158 A1 | 9/2006 | Brewer |
| 2008/0028664 A1 | 2/2008 | Anthony |
| 2009/0272020 A1* | 11/2009 | Bill ...................... A01M 31/06 |
| | | 43/2 |
| 2012/0090217 A1 | 4/2012 | Young |
| 2014/0259860 A1* | 9/2014 | Baskfield .............. A01M 31/06 |
| | | 43/3 |
| 2017/0049095 A1 | 2/2017 | Hanson |
| 2019/0116782 A1* | 4/2019 | Hanson ................. A01M 31/06 |
| 2021/0186003 A1* | 6/2021 | Denmon ............... A01M 31/06 |
| 2021/0244014 A1* | 8/2021 | Furness ................ A01M 31/06 |
| 2023/0263154 A1 | 8/2023 | Denmon et al. |

OTHER PUBLICATIONS

Yu, Junzhi et al. (2007). "An adjustable scotch yoke mechanism for robotic dolphin." 2007 IEEE International Conference on Robotics and Biomimetics (ROBIO), pp. 513-518. [Retrieved Mar. 25, 2024] Retrieved from the Internet: <https://www.semanticscholar.org/paper/An-adjustable-scotch-yoke-mechanism-for-robotic-Yu-Hu/a706b931f8f5beda7fbd79017a21e65748cbb925>.

* cited by examiner

1300

FEEDING MOTION DUCK DECOY

The present application claims the priority of U.S. Provisional Application No. 63/442,725, filed Feb. 1, 2023, which is hereby incorporated in its entirety.

FIELD OF THE INVENTION

The invention is in the field of waterfowl decoys, specifically motion duck decoys.

BACKGROUND

One of the most common and unique motions that a duck makes is a roughly 90-degree forward rotation to feed on the floor of ponds, lakes, and marshes. Ducks do this by rotating about their breasts, extending their heads deep into the water, and letting their tails stick straight into the air. In the sport of waterfowl hunting, there is a void in the market for a motion duck decoy that can reproduce this characteristic "tail up" duck feeding motion effortlessly and realistically.

Other solutions do not effectively or realistically mimic the natural and realistic feeding motion of living ducks. Other solutions do not create a disruption on the water surface. Oher decoys do not reveal the characteristic "flash" that attracts the eye of other ducks passing high overhead. Other motion decoys use external components such as cables, wires, jig rigs, external weights and weight systems, motors, battery packs, bungee cords, electrical cords that are tedious, difficult and time-consuming to set up and can be ensnared in weeds, sticks and other water debris.

SUMMARY

Embodiments of the invention relate to duck decoys, in particular to a motion duck decoy that mimics the feeding motion of a duck. Embodiments may include a full body duck decoy that rotates from a resting position on the surface of the water to a duck feeding position.

Disclosed is an embodiment of a motion duck decoy, comprising a duck decoy comprising a weight and a power source enclosed within the duck decoy, whereby powered motion of the weight within the duck decoy causes the duck decoy to mimic the feeding motion of a duck. In the duck feeding position, the duck head is submerged, and the duck tail section is elevated above the surface of the water. Elevating the duck tail section above the surface of the water may reveal a light-colored area of the underside of the decoy. A motor may be enclosed within the decoy. The decoy may include a Scotch yoke mechanism coupled to the motor and adapted and configured to move the weight within the decoy.

Also disclosed is an embodiment of a motion duck decoy, comprising a duck decoy comprising a weighted motor assembly comprising a weight, a power source, and a motor, and a dynamic decoy shell coupled to at least one element of the weighted motor assembly, wherein applying power to the motor causes the dynamic decoy shell to rotate between a resting duck position and a duck feeding position.

Also disclosed is an embodiment of a motion duck decoy comprising a duck decoy, and disposed within said duck decoy, a weight and means for moving the weight within the decoy to cause the duck decoy to mimic the feeding motion of a duck.

DETAILED DESCRIPTION

Embodiments of the invention relate to a waterfowl hunting decoy used to mimic the behavior of a feeding duck. The motion duck decoy may include a seamless shell shape and a wireless remote to control the on/off motion of the bird. The decoy may use a battery pack to power a motor or other mechanism that moves a weight to move the center of gravity of the decoy forward, thereby causing the forward part of the duck decoy to rotate into the water and mimic the feeding motion of a duck. The forward part of the decoy that rotates into the water may include the duck head, the neck, and/or breast sections of the decoy. The motion of the duck may be achieved via a Scotch yoke mechanism connected to a track with the weight. Electronic and mechanical components such as weight, Scottish yoke, batteries and motor may be wholly contained within the decoy.

Figure 1:
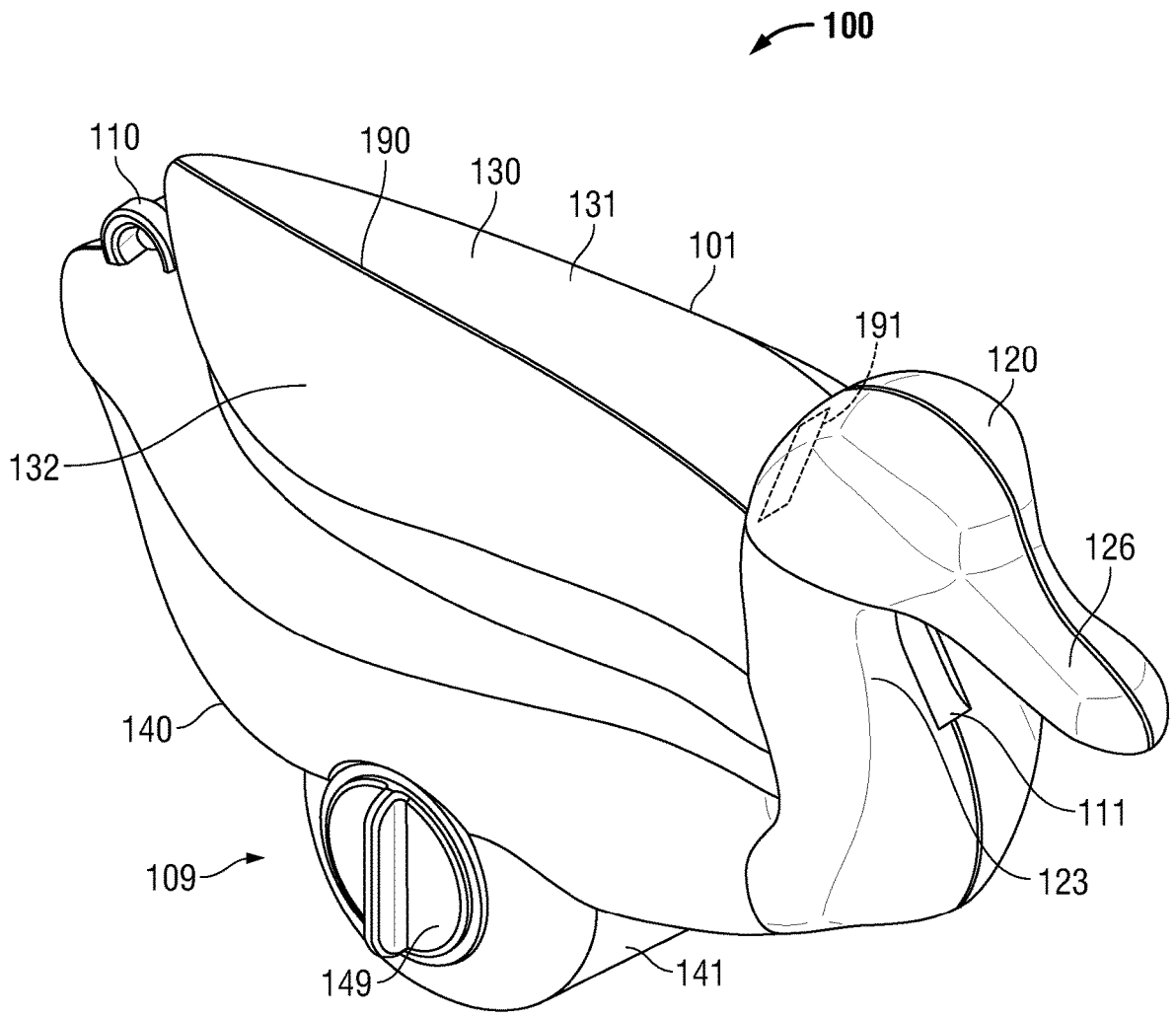
FIG. 1 illustrates the assembled shell of an exemplary motion duck decoy.

FIG. 1 shows an exemplary duck decoy 100 according to an embodiment of the invention. Decoy 100 has a shell 101 with top shell surface 130, bottom or underside shell surface 140, battery pack 109, battery compartment cap 149, tail feathers 110, and duck head 120.

The shell 101 of decoy 100 may be hollow and may house the mechanical and electrical components of the decoy. The shape of shell 101 may be designed to mimic the dynamic nature of a duck while maintaining a stable, buoyant, and waterproof vessel for the decoy's internal mechanical and electrical components. Natural duck markings may be painted, printed or etched on the top shell surface of the decoy to give it the realistic appearance of any different type of duck.

The bottom or underside shell surface may be colored white, or a lighter color that contrasts with the coloration and markings on the top shell surface, to reveal a visual "flash" when the decoy goes "tail-up" into the feeding position.

Figure 13:
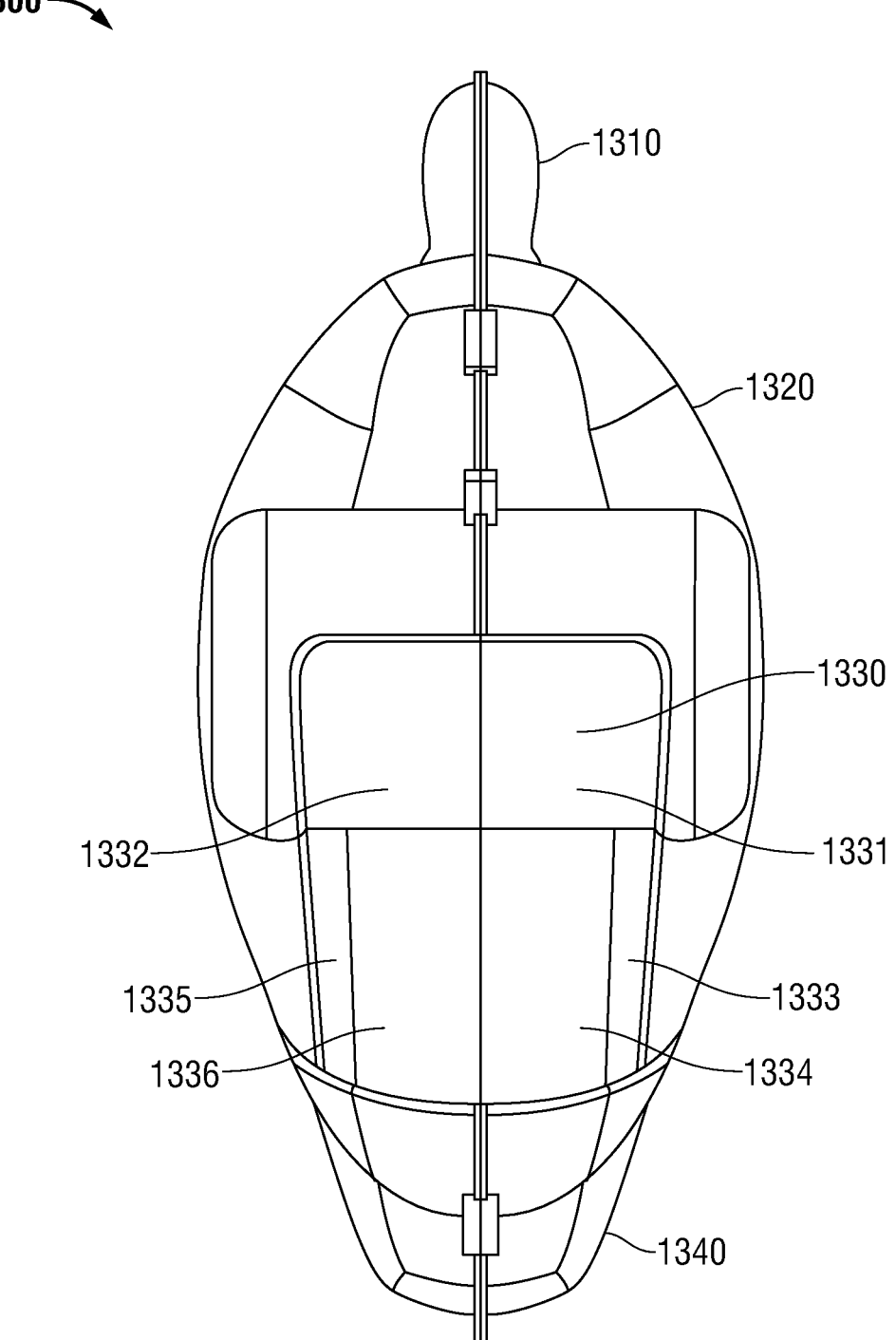
FIG. 13 is a bottom perspective of an embodiment of a shell of an embodiment of a motion duck decoy.

FIG. 13 shows a bottom perspective of an embodiment of a shell (1300) of an exemplary duck decoy including duck head section (1310), duck tail section (1340), loop (1350), and underside (1320). Underside 1320 includes white or light-colored section 1330. In an embodiment white or light-colored section 1330 may include one or more white or light-colored panels or areas (1331, 1332, 1333, 1334, 1335, 1336). The flash may catch the eyes of ducks or waterfowl as they fly over the decoy. The flash also improves visibility (relative to static decoys, for example) to ducks passing overhead a significant distance away from the decoy, for example, at an altitude in excess of 4,000 feet.

The bottom shell surface 140 of shell 101 may be flat, substantially flat, or substantially planar. The bottom or underside shell surface 140 may include a rounded shape or protrusion or shape 141 to assist body rotation. Rounded shape 141 may take the form of a half cylinder. Rounded shape 141 may be located in or towards the forward section of the decoy to assist body rotation. The duck head 120 of the decoy includes an internal cavity (not shown in FIG. 1). A water port 111 may be located on the forward side of neck 123 and an air port 191 may be located on the aft side of neck 123.

In an embodiment, the air port 191, water port 111, and the internal cavity of the shell (not shown) improve buoyancy of the decoy. As the forward part of the decoy arcs into the water in the beginning of a feeding cycle, water flows into the cavity through water port 111 and air exits the cavity through air port 191, and the water in the cavity helps the duck head remain submerged during the feeding cycle. As the duck head exits the water at the end of the feeding cycle the water flows out through water port 111 and air port 191. In embodiments, there may be two or more water ports, for example one in the neck and one in the underside of beak 126; and a water port may extend from the neck to the underside of beak 126.

Shell 101 may be manufactured in two shell sections 131, 132. In an embodiment, shell sections 131, 132 may correspond to port and starboard halves of the decoy that join along a longitudinal line 190 that runs down the center of shell upper or top surface 130 and shell bottom surface 140. In alternative embodiments, shell 101 may be manufactured in two, three or more sections that join at various positions, areas, locations or along different lines corresponding to the geometry of the shell sections. Shell sections 131 and 132 may be joined or fastened together by a silicon adhesive or other waterproof adhesive seal. Other bonding means may be used to join or fasten together the two halves, including for example ultrasonic welding, hot plate welding, or laser welding.

Shell 101 may include an opening allowing for access into battery compartment (not shown in FIG. 1). A waterproof or watertight threaded cap 149, which may be circular, may provide access to the battery compartment from the exterior of shell 101.

Figure 2:
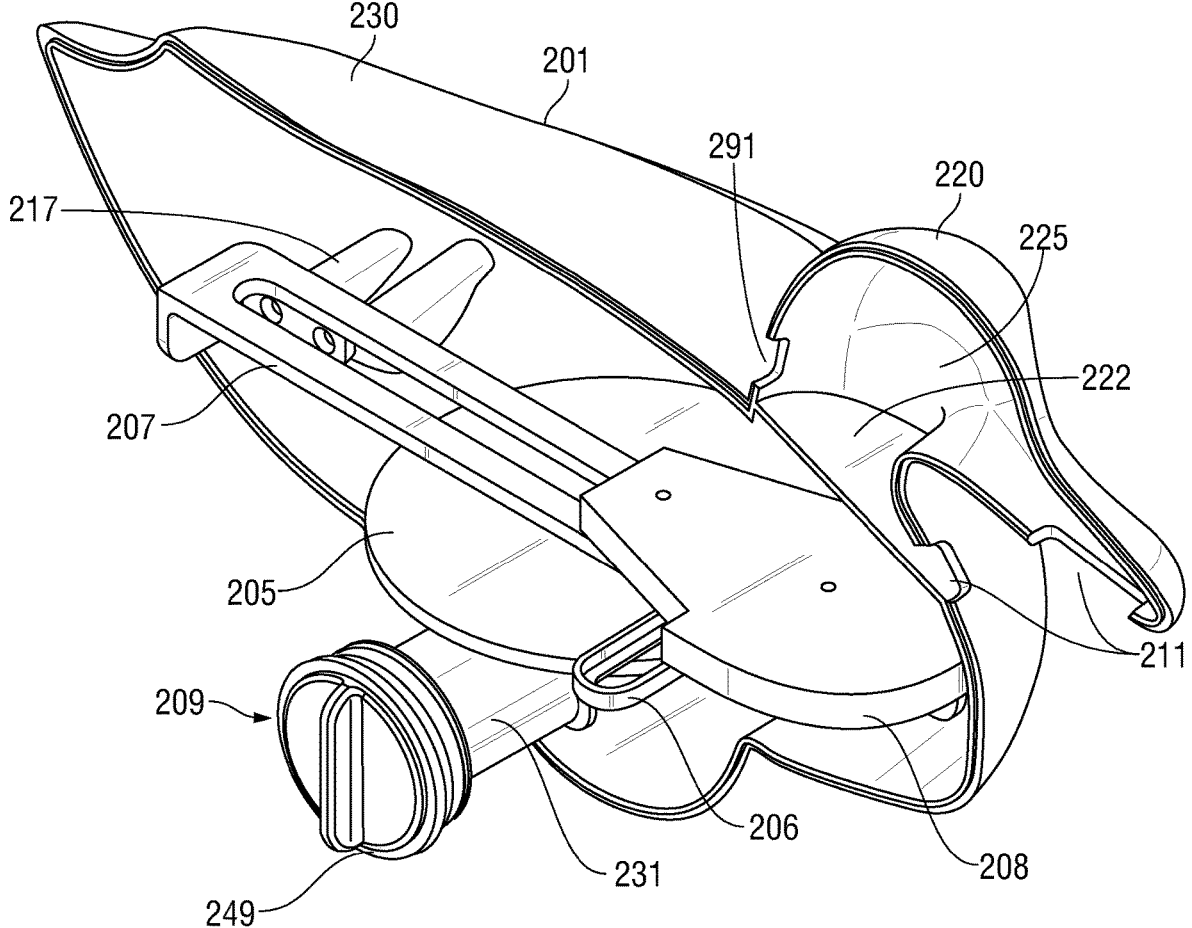
FIG. 2 illustrates the internal assembly mounted inside a shell section of an exemplary motion duck decoy.

FIG. 2 shows an exemplary duck decoy shell section 201 according to an embodiment of the invention. Decoy shell section 201 includes shell interior 214 and duck head 220. Duck head 220 may include water cavity 225, cavity floor 222, and air port notch 291 and water port notches 211. Shell interior 214 may include internal electrical and mechanical components track 207, weight 208, wheel (or disk-shaped crank) 205, sliding yoke 206, battery pack 209, battery compartment 231, and waterproof or watertight threaded cap 249. Cap 249 may be used to create a watertight seal between the cap and the shell. Cap 249 may use a rubber or silicon ring or O-ring that is compressed or squeezed between the cap and the shell. The watertight seal formed by the cap may be used to protect the battery pack, internal and electrical assembly from exposure to water. The battery pack may be placed into or mounted on a battery mount that is fastened or connects to the shell mounted via threaded screws. The battery mount may house the battery pack and/or battery snap connector. The battery pack may be rechargeable, for example via a USB port; the battery pack may be removeable or fixed inside the decoy. Shell interior 214 may include threaded supports or holes 217 for the mounting of the aft end of yoke 207. Shell interior 214 also may include threaded supports or holes (not shown) for mounting the forward end of yoke 207.

Cavity floor 222 may be substantially planar and may substantially follows the surface of shell upper or top surface 230. In an embodiment, cavity floor 222 prevents water in cavity 225 from entering shell interior 214 where the electrical components are located. In an embodiment, the volumetric size of cavity 225 may affect the arcing motion. Use of creative shell design with the location and orientation of cavity floor 222 may improve the performance of the decoy. If the duck head does not submerge completely, the cavity may be increased in size to hold more water. If the duck head over-arcs, the size of the cavity can be reduced. The location of cavity floor 222 may be elevated to reduce the volume of cavity 225 or lowered to increase the volume of cavity 225.

Figure 3:
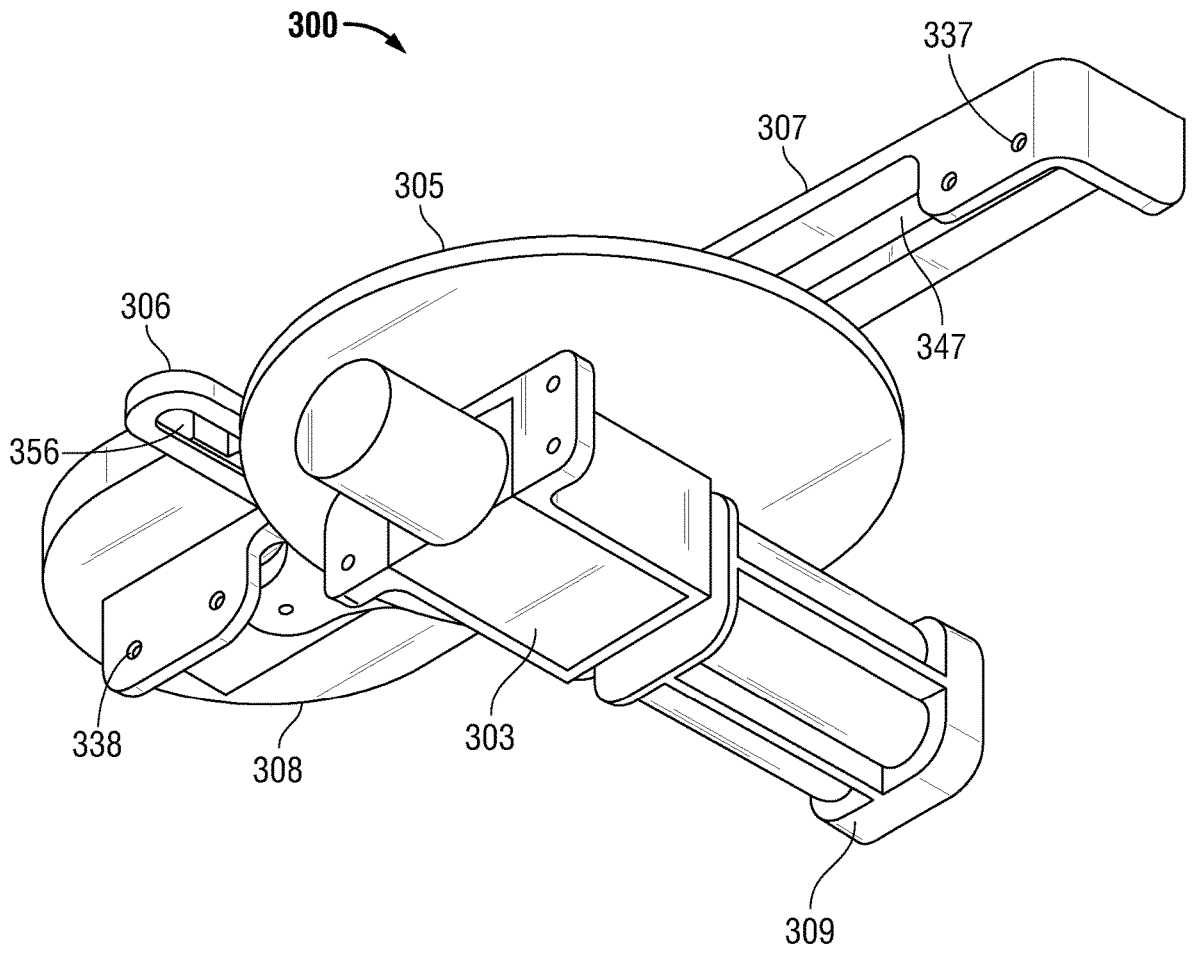
FIG. 3 illustrates one perspective of the internal assembly of an exemplary motion duck decoy.

FIG. 3 illustrates one perspective of an exemplary internal assembly 300 of an exemplary duck decoy according to an embodiment of the invention. Shown in FIG. 3 are track 307 with track slot (or slit) 347, wheel 305, sliding yoke 306 and yoke slot (or slit) 356, weight 308, motor 303, and battery pack 309. Track 307 may include threaded holes 337, 338 for mounting or fastening track 307 to threaded supports or holes in the interior of the decoy.

Figure 4:
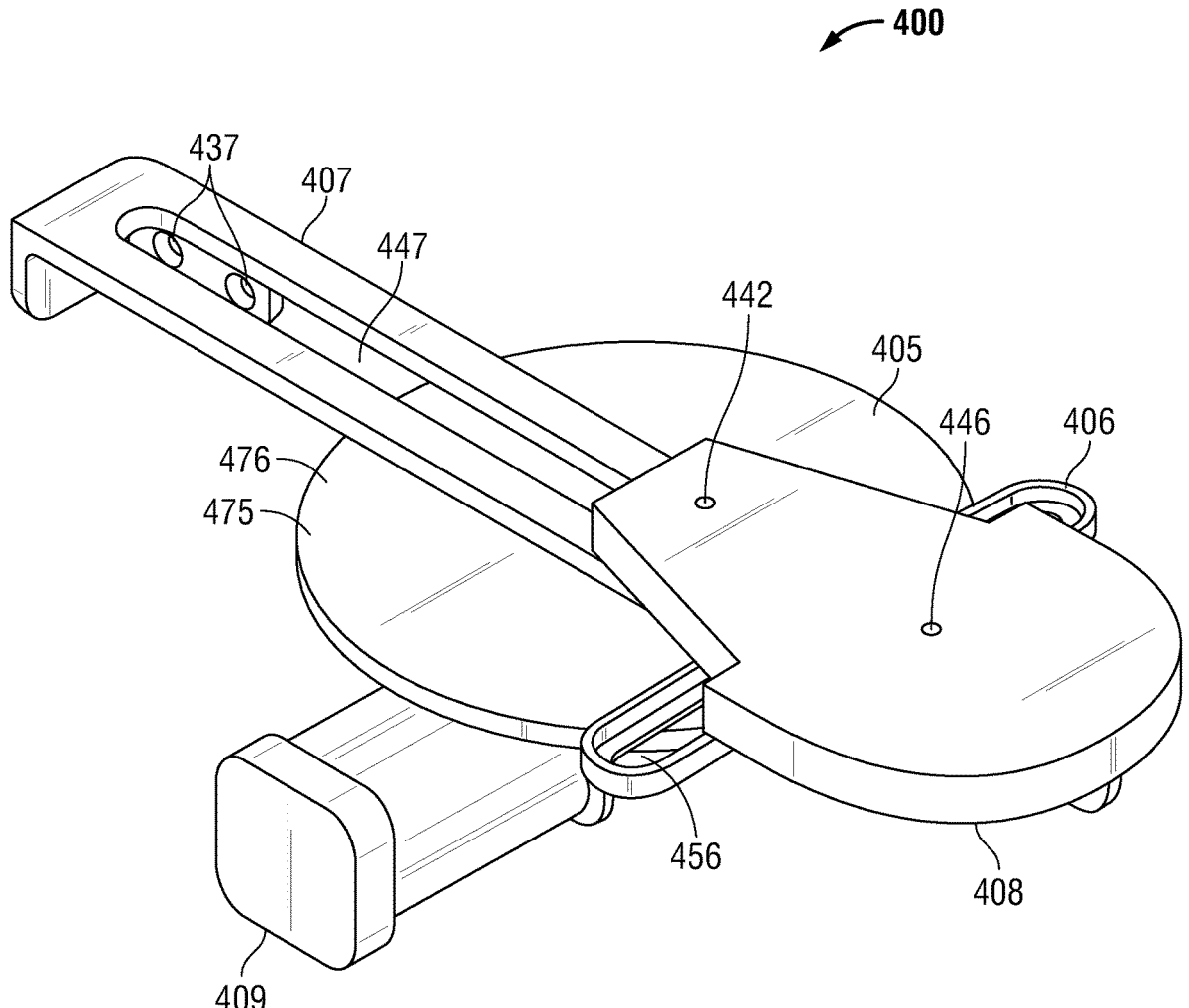
FIG. 4 illustrates an alternative perspective of an internal assembly of an exemplary motion duck decoy.

FIG. 4 illustrates an alternative perspective of an exemplary internal assembly 400 of an exemplary duck decoy according to an embodiment of the invention. Shown in FIG. 4 are track 407 with track slot 447, threaded hole 437, wheel 405, sliding yoke 406 and yoke slot (or slit) 456, weight 408, screws 442, 446 for mounting weight 408 to sliding yoke 406, and battery pack 409.

Figure 6A:
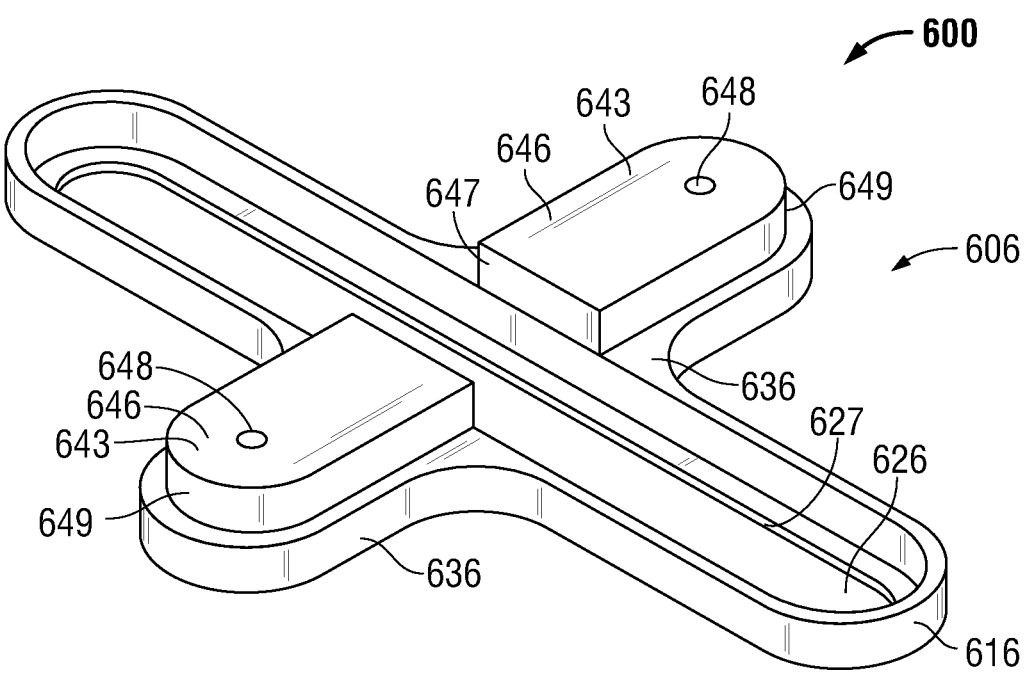
FIGS. 6A and 6B illustrate different perspectives of a component of an internal assembly of an exemplary motion duck decoy.
Figure 6B:
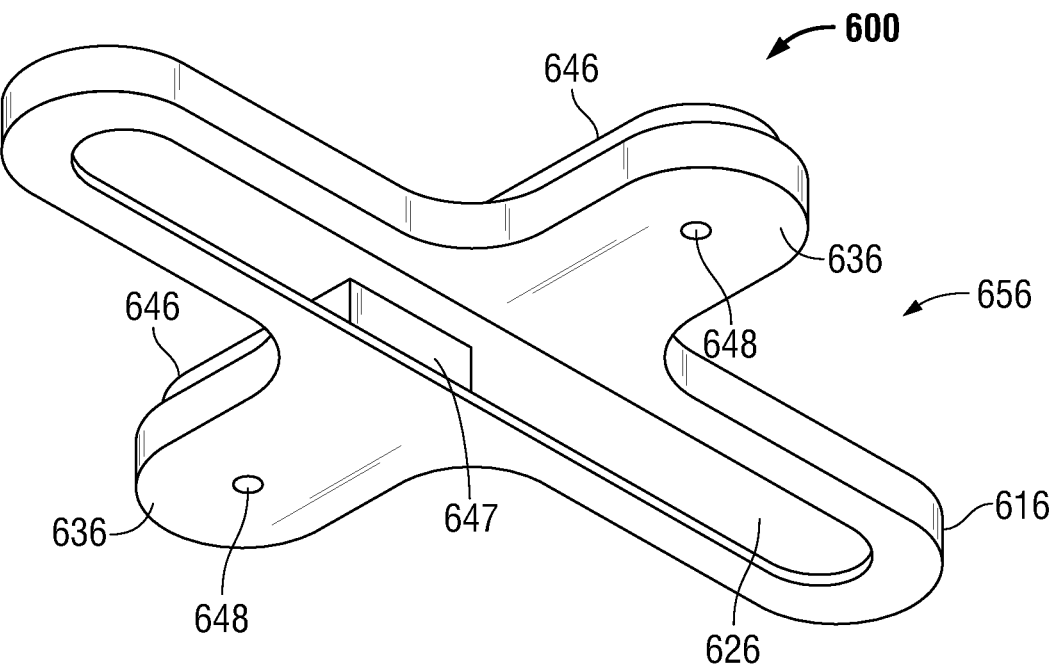

FIG. 6A illustrates a perspective (606) from above, and FIG. 6B illustrates a perspective (656) from below, of an exemplary sliding yoke 600 according to an embodiment of the invention. Sliding yoke 600 may include body 616, slot 626, flanges 636, and slider blocks 646 mounted to flanges 636. In an embodiment each slide block 646 may include a planar foot 647 and rounded head 649. Rounded head 649 may include a threaded hole 648 for fastening sliding yoke 600 to the weight (not shown). In an embodiment, planar foot 647 may be flush with inner planar surface 627 of slot 626.

As illustrated in FIGS. 4 and 6, weight 408 may be fastened to sliding yoke 406, 600 via screws 442, 446 screwed or threaded into screw holes 648 in slide blocks 646. In an embodiment, weight 408 may be mounted flush against upper surfaces 643 of slide blocks 646.

Weight 408 may be specifically designed to fit inside of the shell. The forward shape of weight 408 may conform to the shape of the forward end of the interior of the shell. In an embodiment, the shape of the weight may ensure that more than half the mass of weight 408 is in the forward half of weight 408 as it is installed in the decoy. The shape of the weight may be designed to allow for the center of mass to be in the center of the decoy above the motor and battery compartment when the decoy is in the resting position. When the weight is moved forward within the decoy towards the bow or head of the decoy, may shift the center of mass of the decoy forward of the center of mass of the decoy in its resting position. The weight may be moved to the most forward position within the decoy permitted by the geometry of the shell and the shell and other internal components. The weight may be moved to a position forward of the center of gravity of the decoy in its resting position. The shifting of the center of mass of the decoy forward with the weight forces the body of the decoy to rotate, the duck head to arc into the feeding position, the tail of the decoy to rise, and the underside of the decoy to "flash."

Figure 5:
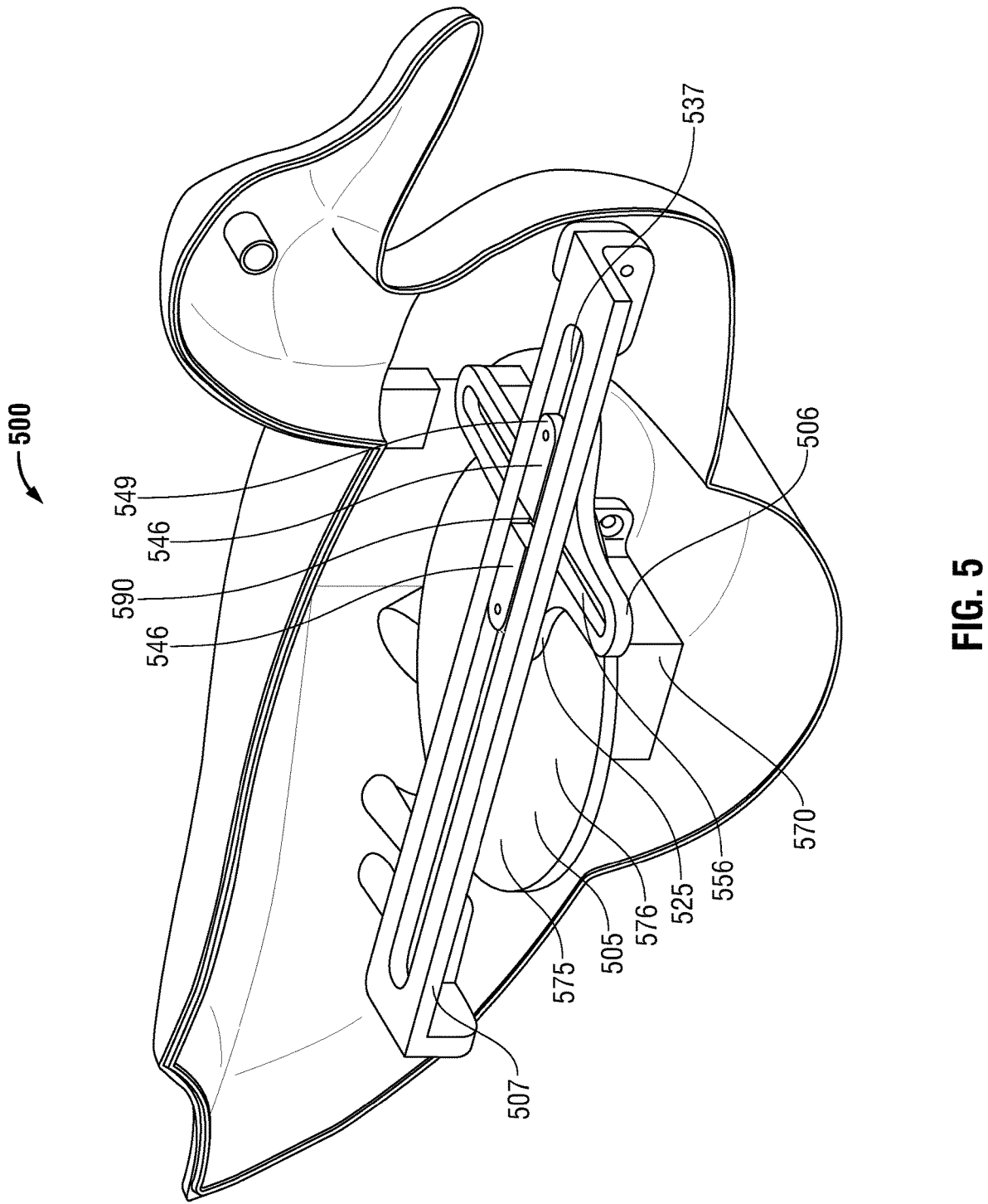
FIG. 5 illustrates an illustrates an alternative perspective of an internal assembly of an exemplary motion duck decoy.

FIG. 5 illustrates how sliding yoke 506, track 507, and wheel 505 may work together according to an embodiment of the invention. Slide blocks 546 of sliding yoke 506 fit within and slide linearly within track slot 537 of track 507 inside decoy shell 500. In an embodiment, the rounded heads 549 of slide blocks 546 minimize friction as slide blocks 546 move linearly in track 507. As sliding yoke 506 moves linearly along track 507, it passes above and substantially parallel to the upper surface of wheel 505. There may be a gap 525 between the upper surface of wheel 505 and lower surface of sliding yoke 506 to avoid friction between wheel 505 and sliding yoke 506. Wheel 505 may include an upwardly-extending pin (not shown) that extends through gap 525 and into yoke slot 556 to engage sliding yoke 506. In the fully-forward configuration of weight 505 shown in FIG. 5, the pin may be located under gap 590 between slider blocks 546.

As shown in FIGS. 4 and 5, the sliding yoke 406, 506 and weight 408 assembly move longitudinally along track 407, 507, a static element of the slider-crank assembly. To minimize friction as slide blocks (546) slide though the track (507, 407), the track and slide blocks may be constructed of plastic or other low-friction material. In an embodiment, track slot (or slit) 447 may extend approximately the length of track 407, or approximately half the circumference of the wheel. Track 407 may be mounted to the shell via screws that thread into the shell body at the front and rear.

The sliding yoke (or Scottish yoke) (406, 506) is a dynamic component of the slider-crank assembly that may be sit or be mounted above wheel (405, 505) and below slide (407, 507). An upward-extending pin (not shown) may be mounted, fixed or located on the edge or outer rim (475, 575) of the wheel. The rotational movement of the pin drives the movement of the sliding yoke and weight within the decoy. As the wheel rotates, the pin moves transversely within sliding yoke slot (456, 556) and drives sliding yoke (406, 506) longitudinally through the decoy along track (407, 507). The sliding yoke translates the rotational motion of the wheel to a linear longitudinal motion of the weight within the decoy shell.

Wheel (405, 505), which may be a dynamic component of the assembly, may be mounted in the center of the decoy such that the upper surface of the wheel is below and substantially parallel to track (407, 507) and sliding yoke (406, 506). In an embodiment, the wheel may be mounted above the motor. In an embodiment, the center of gravity of the decoy in the resting position may be located above the center of the wheel. The wheel may be mounted to the motor shaft (not shown) of motor (570). The motor shaft may be a round shaft with a flat edge (or fit key) for securely holding and rotating the wheel. An upwardly extending pin may or located or mounted on the edge or rim (475, 575) and upper edge (476, 576) of the wheel and may fit inside the slot of the sliding yoke. As the motor rotates the wheel, the pin moves in a circular motion around the center of the wheel and transversely within the sliding yoke.

In an embodiment, motor 570 may be a 6-volt worm gear motor mounted internally of the decoy shell. Motor 570 may rotate wheel (505) at a preset rotation per minute. The motor can be sourced through multiple retail such as Amazon, Alibaba, RC Motor Retail Stores. In an embodiment, the wheel may rotate continuously or periodically through 360 degrees at a rate of 10-100 RPM. In an embodiment the wheel may rotate at a rate of approximately 15-30 RPM.

In an embodiment, an electric or electronic transceiver or receiver (not shown) may be mounted inside the shell under the motor and slide. The transceiver or receiver may be used to control or actuate the internal motor in the decoy and control or actuate the feeding motion of the decoy. The transceiver or receiver may control a relay, transistor or similar component between the battery pack and motor. The receiver may connect to an external transmitter or transceiver (for example, a wireless remote) via radio, Bluetooth, or other wireless communication signal or network. The transmitter or transceiver may communicate with the receiver's on/off function. The transmitter or transceiver may have the capability to operate multiple receivers. The transmitter or transceiver may operate one or more receivers from up to 50-100 yards away. The transceiver or receiver may include a motor driver, switching logic, and radio circuitry, for example, Wireless Communication of RF 433 MHz OOK/ASK Modulation Radio. The receiver and transmitter (or transceivers) can be sourced from multiple outlets-RC Toy Retail shops, Alibaba, and Amazon. The receiver may have two 22-gauge wire with a female wire connector attached. The female wire connectors then pair with male end, one connected to the motor and the other connected to the battery snap connector.

In an embodiment, the motion duck decoy may include an anchor mount. The anchor mount (not shown) may have the shape of a major arc circle, protruding from the intersection of the half cylinder on the bottom shell surface of the decoy and the front of the decoy, with a thread hole on the shell's exterior. The anchor mount may be used to connect a decoy rig, which may include a lead weight, monofilament, and a stay-lock snap. A conventional decoy rig can be found at most hunting or outdoor sporting goods retail stores. The lead weight is intended to sit at the bottom of a body of water and hold the decoy in a specific location. The monofilament connects the lead weight to a stay-lock snap and the stay-lock snap connects directly to the thread hole on the shell exterior. A decoy rig can facilitate set up, retrieval, and storage of the decoy.

In embodiments, the plastic components of the decoy may be a mixture of 3D-printed, roto-mold, and injection-molded parts utilizing nylon, ABS or polyethylene (e.g., HDPE, LDPE) plastic. In an embodiment, the track, sliding yoke, wheel, battery compartment, and battery cap may be fabricated using a 3-D printer. In an embodiment, one or more of these components may be injection molded. The exterior shell components may be painted with non-toxic, environmentally safe paint. After the shell has been painted, the mechanical and electrical assemblies are mounted into the shell and the two shell halves are bonded together. The electrical components may be conventional off-the-shelf components, readily available through outlets such as amazon, Alibaba, and RC Retail stores. Alternative embodiments may be injection molded, roto molded, or 3-D printed. The assembly processes differ given different mechanical assemblies, electrical components and shell shape.

In an embodiment, the outer dimensions of the shell may be approximately 16" long by 7" wide. The height may be approximately 6" to the upper surface of the shell and 9" to the upper surface of the duck head. The outer dimensions of the shell may vary, and the dimensions may change depending on the type or species of duck the decoy is intended to mimic.

The weight, in an embodiment, may be made of lead, may be formed in a mold, and may weigh in the range of 200-800 grams, or more for a large decoy. In an embodiment the weight weighs 600-700 grams.

Figure 7A:
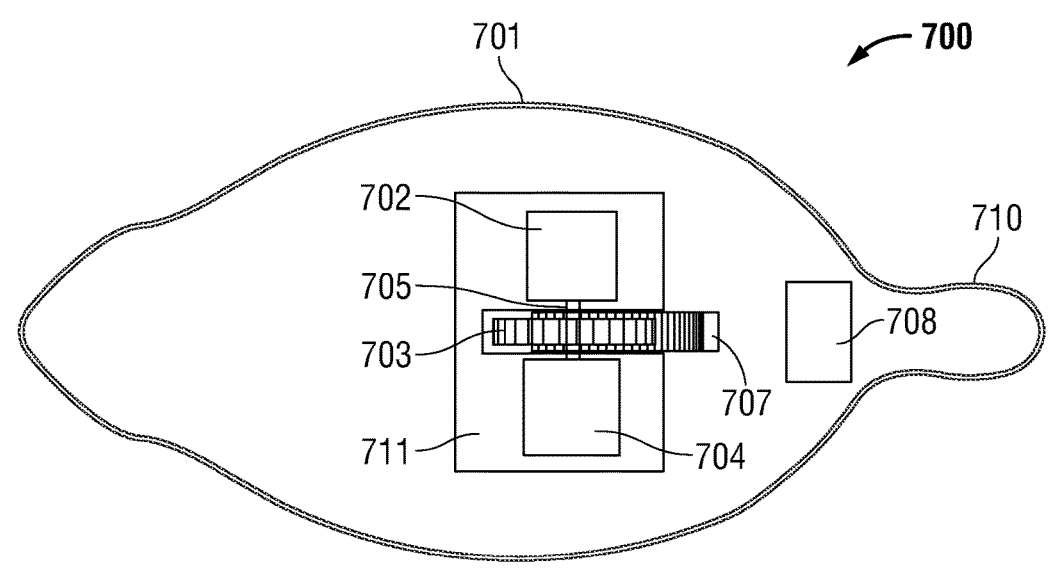
FIGS. 7A, 7B, and 7C illustrate different perspectives of an alternative embodiment of an internal assembly of an exemplary motion duck decoy.
Figure 7B:
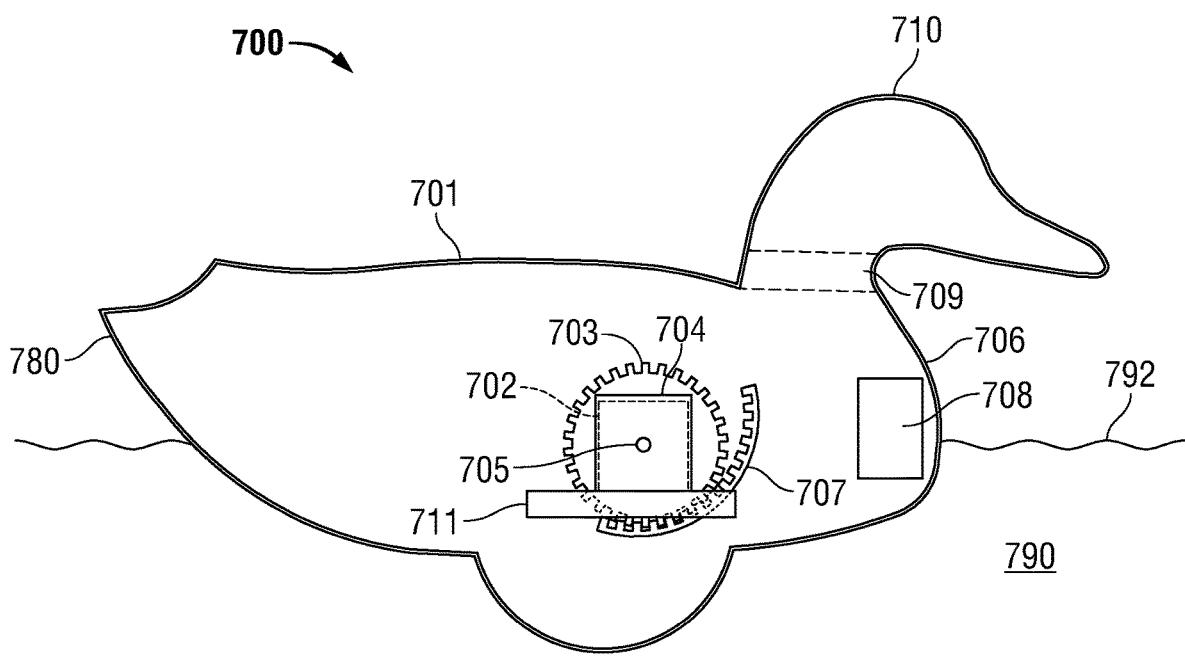
Figure 7C:
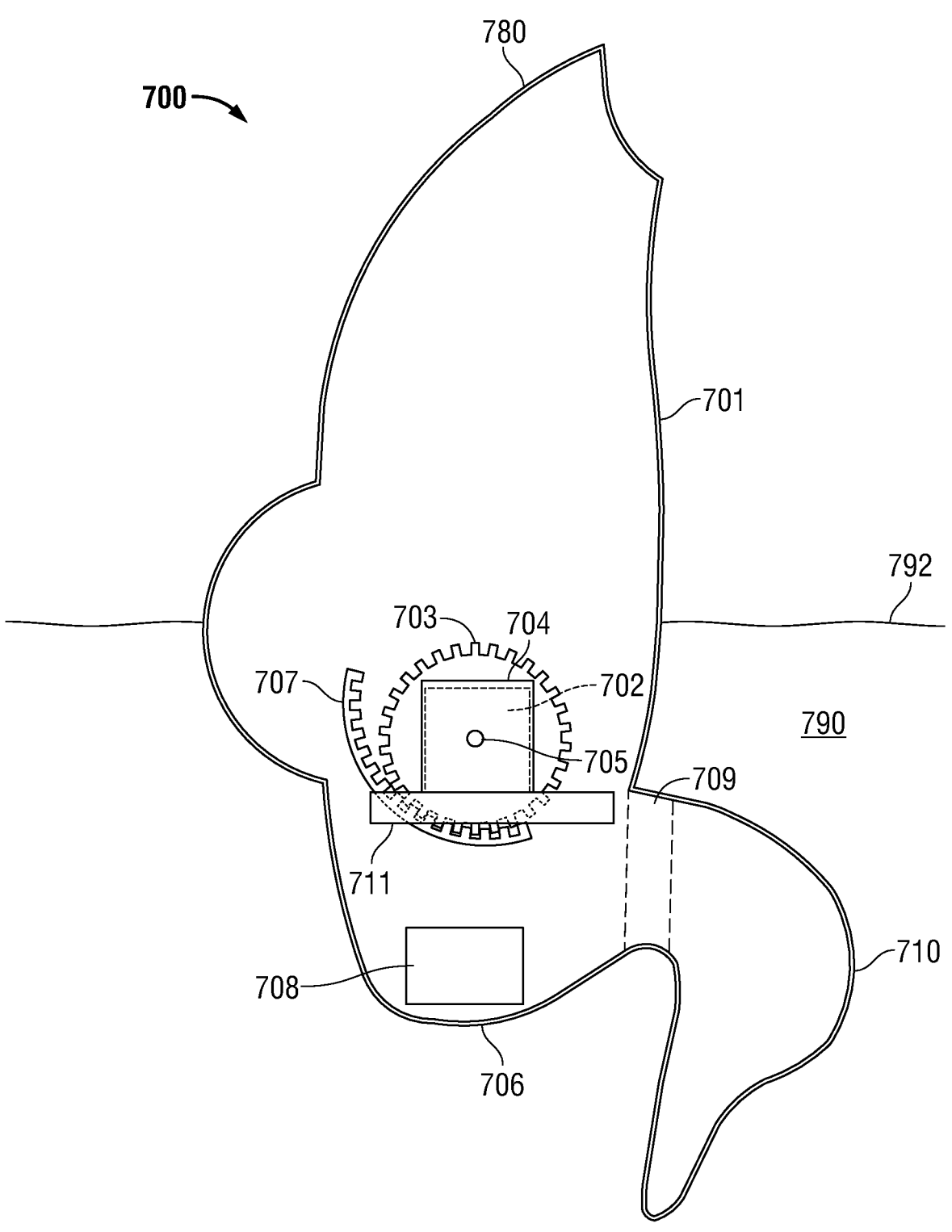

FIGS. 7A, 7B, and 7C illustrate different perspectives of an alternative embodiment of an internal assembly of an exemplary motion duck decoy. FIG. 7A illustrates a sectional view from above; FIG. 7B illustrates a side sectional view of the decoy in a resting position on the surface 792 of water 790; FIG. 7C illustrates a side sectional view of the decoy in a feeding position with the head (710) and breast (706) of the decoy below the surface 792 of the water and the tail 780 elevated above the surface 792 of the water.

The alternative embodiment shown in FIGS. 7A, 7B, and 7C includes a gear track assembly that rotates the decoy into the duck feeding position. Decoy 700 may include a decoy shell (701), a motor (702), which may be centrally anchored, a battery pack (704) to power the motor, a weight (711), a circular gear (703) rotated by an axle (705), and a semicircular gear track (707) positioned within and secured or mounted to the decoy shell (701). The motor, battery pack, and weight may be included in a weighted motor assembly, which may also include circular gear (703). The motor or weighted motor assembly may be mounted to the decoy shell using a swivel or other rotatable mount that allows the decoy shell to rotate relative to the motor or weighted motor assembly. The motor may be actuated or cycled by a receiver (708). In an embodiment, motor (702), battery pack (704), and weight (711) are connected or secured to circular gear (703) and remain substantially stationary or level with respect to the water surface (792). Actuation of the motor causes circular gear (703) to rotate within gear track (707) causing the decoy shell to rotate about the motor, weight, and battery pack into and out of the feeding position. These elements force a dynamic weight shift and induce pivotal body movement from the duck resting position to the duck feeding position. The weight or the combined weight of the components of the weighted motor assembly may ensure that the weight or weighted motor assembly remains stable or substantially stationary as the decoy rotates into the feeding position. An adjustable air gap (709) in the neck facilitates efficient head submersion using one or more ports for water or air (not shown). The feeding motion of the decoy may be altered by reconfiguration, for example changing the location within the shell or with respect to other components and location of elements such as motor (702) placement, receiver (708) positioning, axle (705) adjustment, gear (703) augmentation, pin variation, and track (707). The weight (711) can also be adjusted in size, position, or material to achieve the desired motion.

Figure 8A:
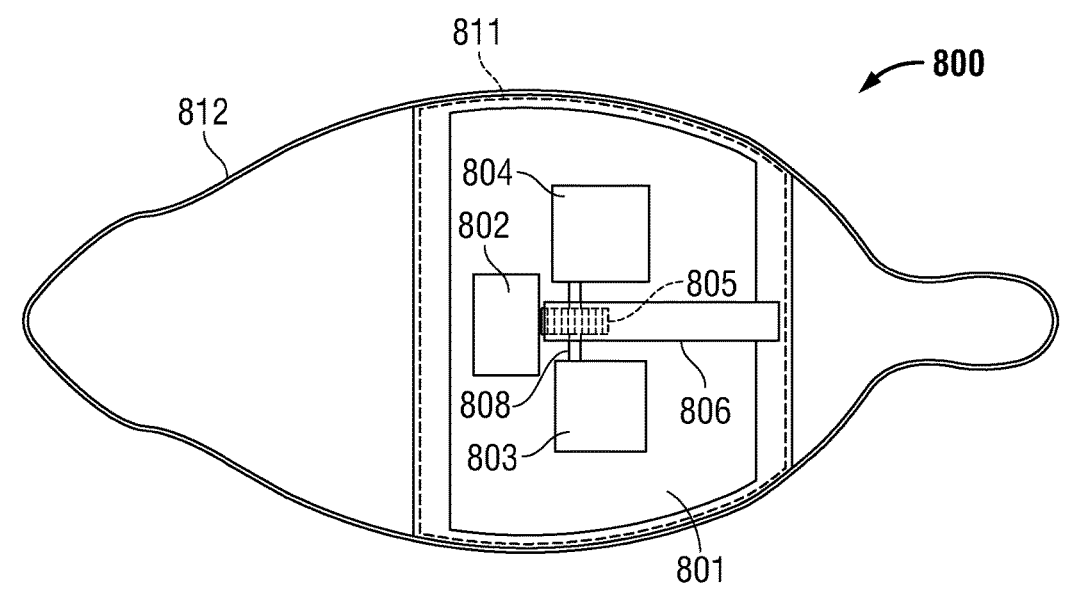
FIGS. 8A, 8B, and 8C illustrate different perspectives of an alternative embodiment of an internal assembly of an exemplary motion duck decoy.
Figure 8B:
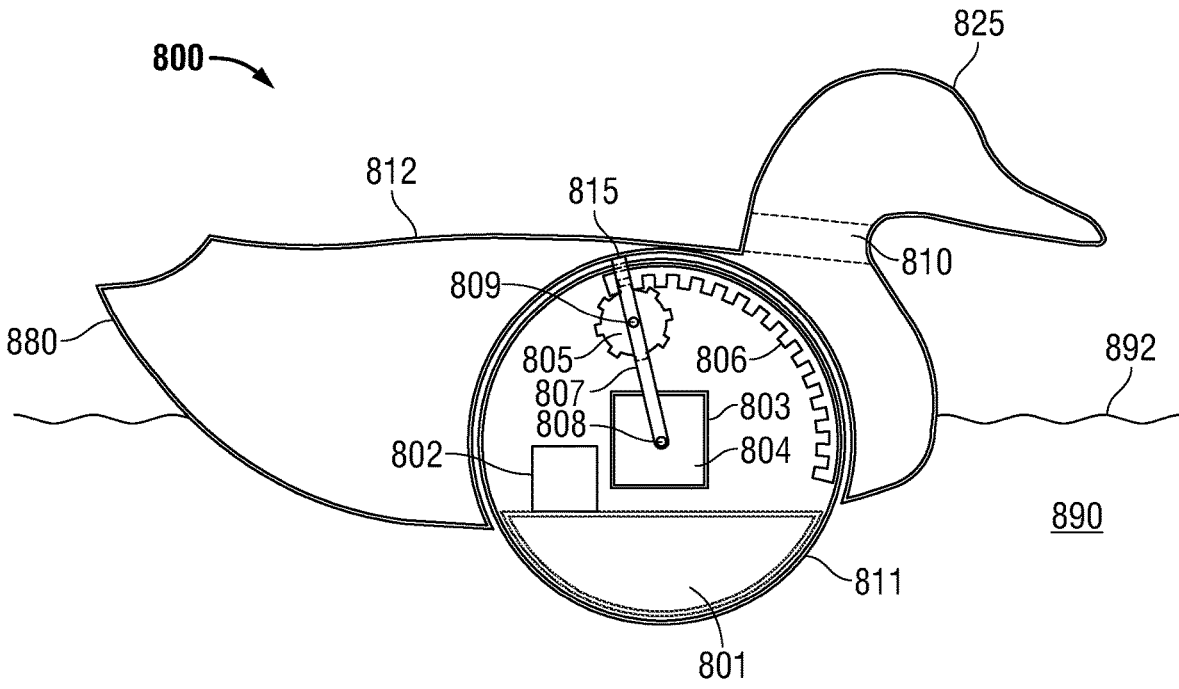
Figure 8C:
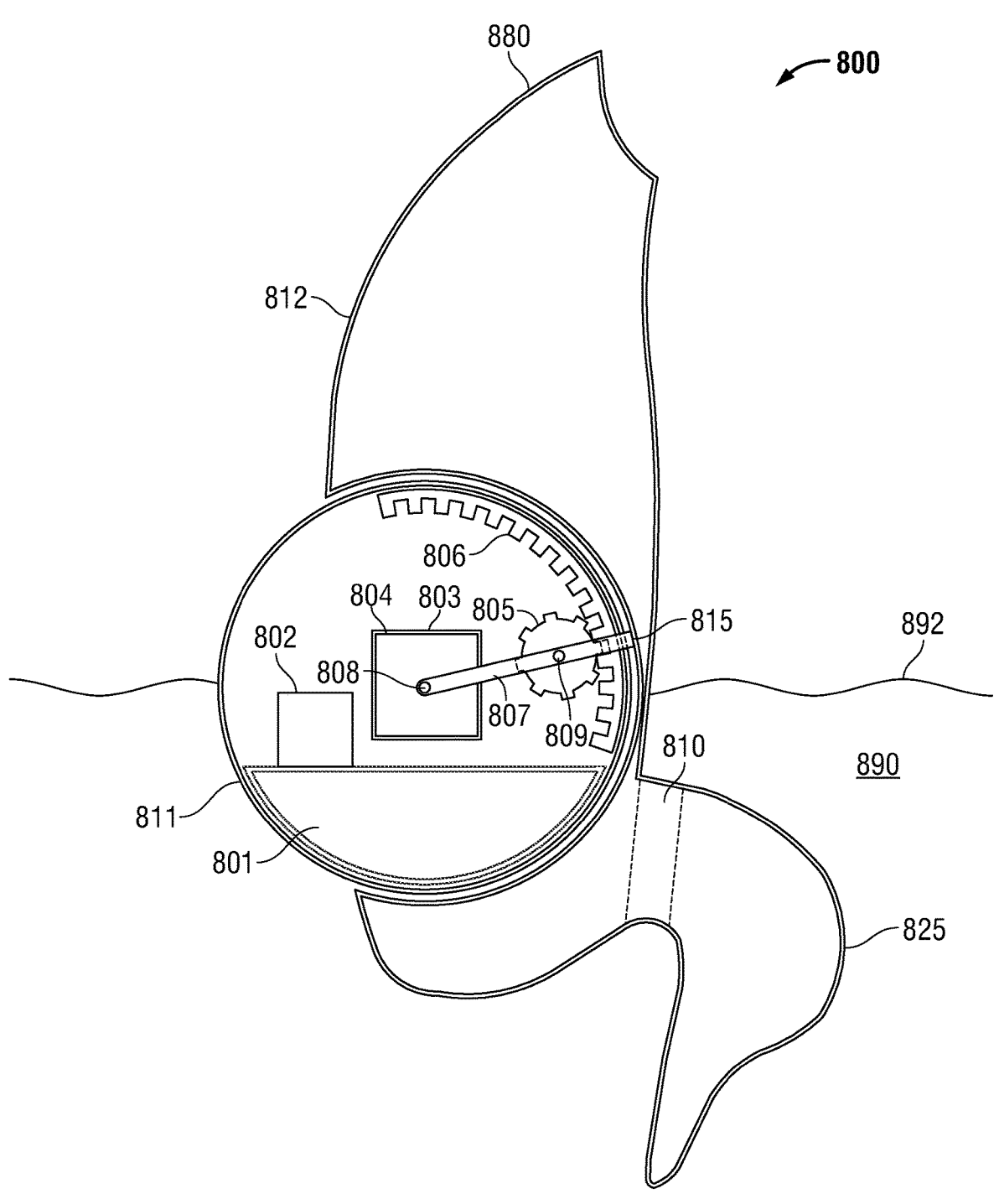

FIGS. 8A, 8B, and 8C illustrate different perspectives of an alternative embodiment of an internal assembly of an exemplary motion duck decoy. FIG. 8A illustrates a sectional view from above; FIG. 8B illustrates a side sectional view of the decoy in a resting position on the surface 892 of water 890; FIG. 8C illustrates a side sectional view of the decoy in a feeding position with the head (825) of the decoy below the surface 892 of the water and the tail 880 elevated above the surface 892 of the water.

The alternative embodiment shown in FIGS. 8A, 8B, and 8C includes a dynamic body (812) rotation mechanism that causes the duck decoy to mimic the duck feeding motion. A static body (811) of decoy 800 houses components, including a weight (801), a receiver (802), a battery pack (803), a motor (804), a gear (805), a gear track (806), a lever arm (807), an axle (808), and a pin (809). The weight, motor, and battery pack may be combined in or form a weighted motor assembly within static body (811). The motor (804), which may be actuated or cycled by receiver (802), imparts rotation to the axle (808), linked to the lever arm (807), thereby driving the gear (805) along a semicircular path, guided by the gear track (806). The gear (805) may be connected to the lever arm (807) by the pin (809). Lever arm (807) may mount, connect or couple static body (811) to dynamic body (812) at mounting point (815). Dynamic rotation of dynamic body (812), connected to the lever arm (807), results in a lifelike feeding motion, with the dynamic body (812) moving around the static body (811), going from a duck resting position to a duck feeding position. Static body (811) may remain substantially stationary in relation to dynamic body (812) as the dynamic body rotates into and out of the duck feeding position. The adjustable air gap (810) facilitates submersion of the decoy's head using one or more ports for air or water (not shown). Components, including the weight (801), battery pack (803), motor (804), axle (808), gear (805), pin (809), and gear track (806), can be adjusted in size, position, or material to achieve the desired motion. A stabilizer or similar device can be added to ensure balance of the static body (811).

Figure 9A:
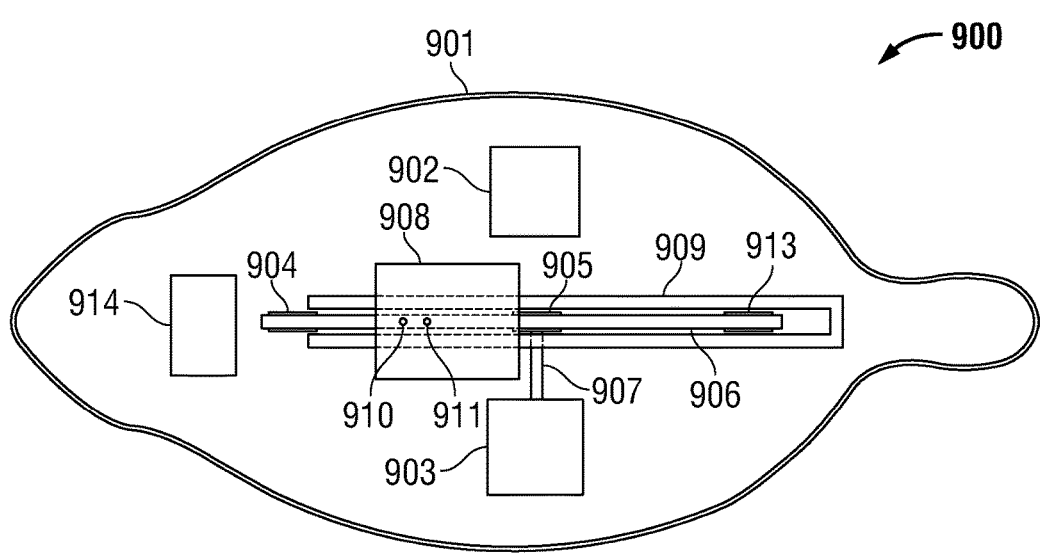
FIGS. 9A, 9B, and 9C illustrate different perspectives of an alternative embodiment of an internal assembly of an exemplary motion duck decoy.
Figure 9B:
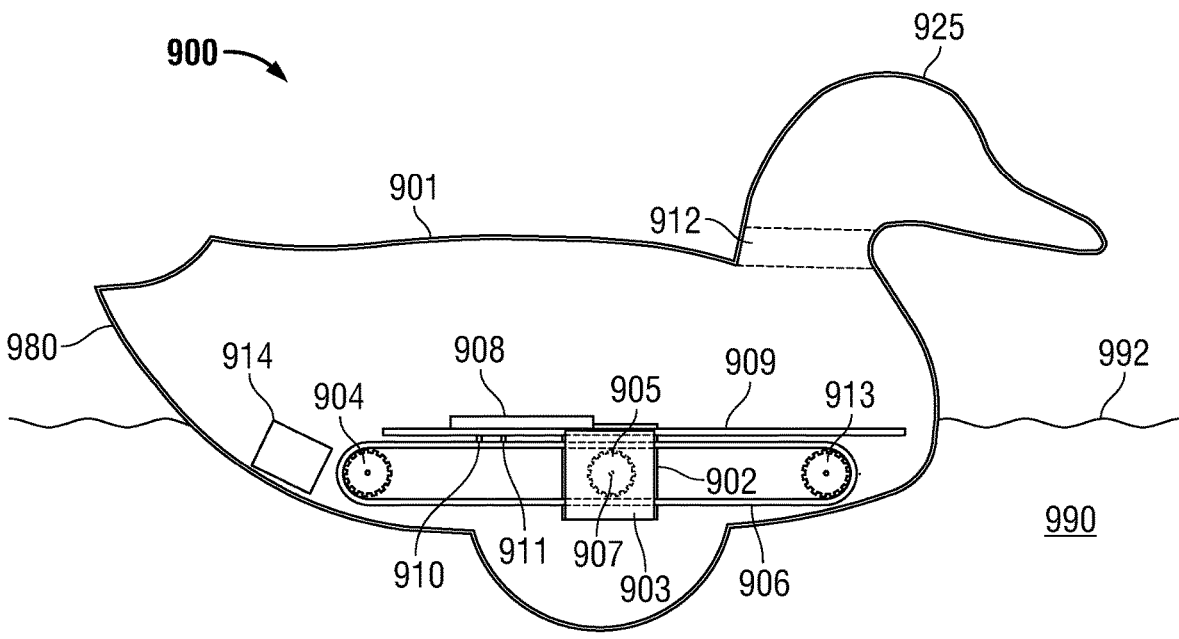
Figure 9C:
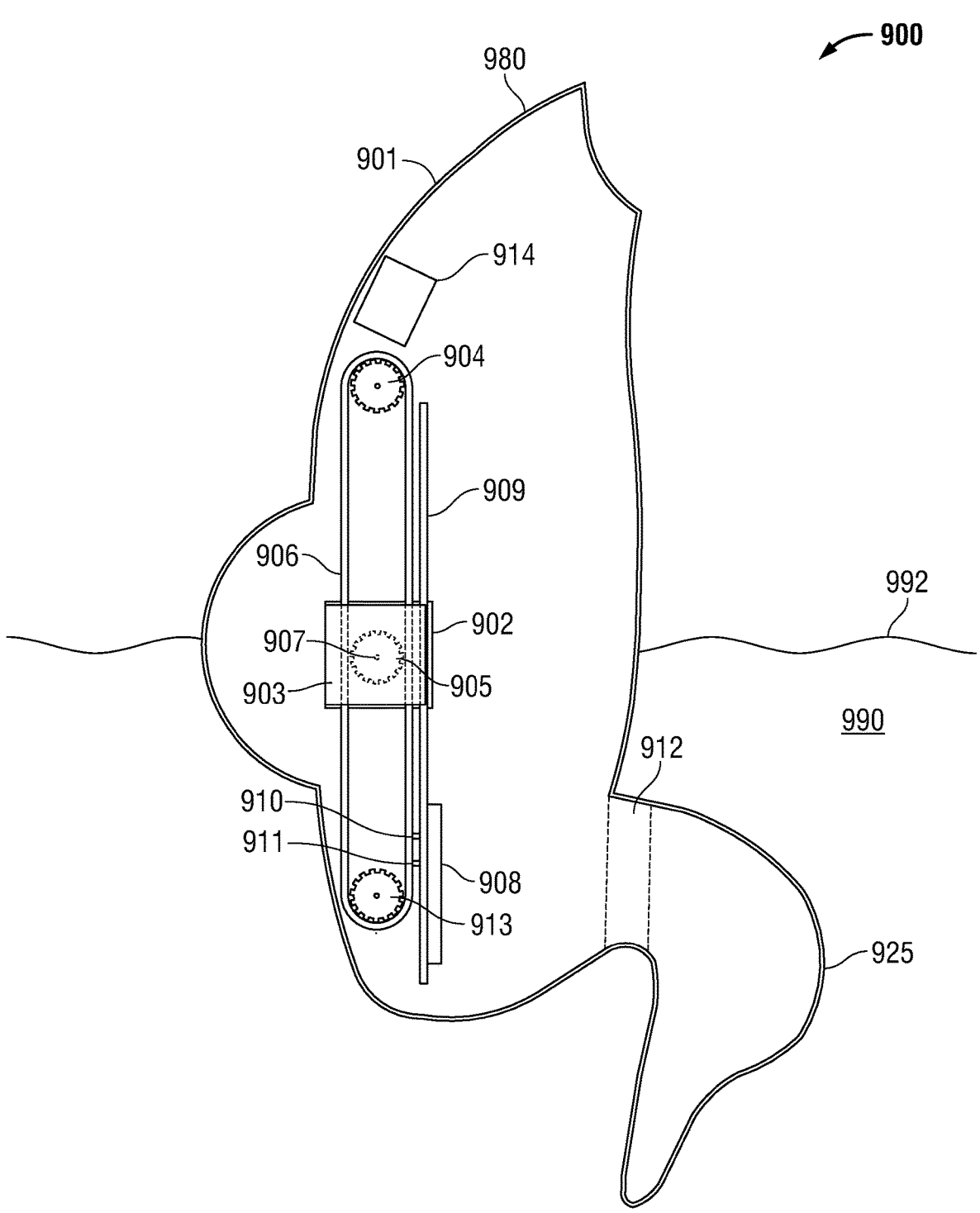

FIGS. 9A, 9B, and 9C illustrate different perspectives of an alternative embodiment of an internal assembly of an exemplary motion duck decoy. FIG. 9A illustrates a sectional view from above; FIG. 9B illustrates a side sectional view of the decoy in a resting position on the surface 992 of water 990; FIG. 9C illustrates a side sectional view of the decoy in a feeding position with the head (925) of the decoy below the surface 992 of the water and the tail 980 elevated above the surface 992 of the water.

The alternative embodiment shown in FIGS. 9A, 9B, and 9C uses a pulley system to achieve a duck decoy feeding motion. The decoy features a shell (901) with lifelike paint and textures, a battery pack (902), and a motor (903) coupled to gear 1 (904), gear 2 (905) with axle (907), and gear 3 (913). A continuous belt (906) establishes a pulley system, orchestrating the movement of a weight (908) connected to the belt by pin 1 (910) and pin 2 (911) extending through slotted slide (909). The motor (903), cycled or actuated by receiver (914), rotates gear 2 (905) which moves the weight (908) and orchestrates a weight shift and induces a pivotal body movement from a duck resting position to a duck feeding position. The positions of gear 1 (904), gear 2 (905), and gear 3 (913) can be adjusted to regulate the extent of lifelike movements, and variations in the pulley system allow for alternative rotation methods, including addition and subtraction of gears. An air gap (912) within the head region allows water passage using one or more ports for air or water (not shown), aiding in the submersion of the head during the feeding motion. The size, location, and configuration of weight (908), battery pack (902), motor (903), axle (907), gear 1 (904), gear 2 (905), gear 3 (913), pin 1 (910), pin 2 (911), and gear track (906) can be adjustable as needed for desired motion. IN alternative embodiments, belt (906) may be replaced by a chain or a track.

Figures 10A, 10B:
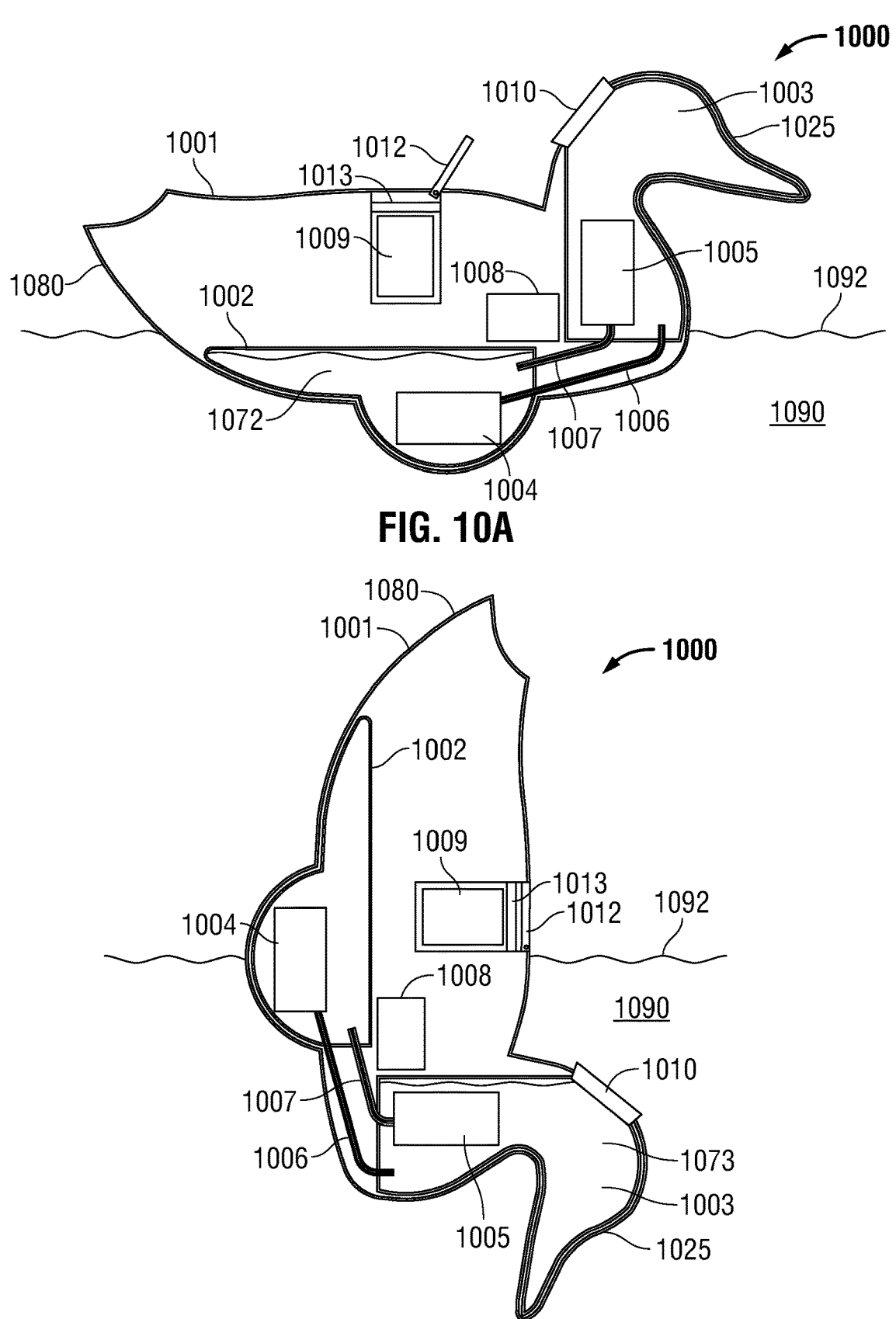
FIGS. 10A and 10B illustrate different perspectives of an alternative embodiment of an internal assembly of an exemplary motion duck decoy.

FIGS. 10A and 10B illustrate different perspectives of an alternative embodiment of an internal assembly of an exemplary motion duck decoy. FIG. 10A illustrates a side sectional view of the decoy in a resting position on the surface 1092 of water 1090; FIG. 10B illustrates a side sectional view of the decoy in a feeding position with the head (1025) of the decoy below the surface 1092 of the water and the tail 1080 elevated above the surface 1092 of the water.

The alternative embodiment shown in FIGS. 10A and 10B uses one or more water pumps to move water between internal chambers to create a duck decoy feeding motion. The decoy features a plastic shell (1001) emulating natural textures, accommodating two chambers: chamber 1 (1002) and chamber 2 (1003). FIG. 10A shows water (1072) in chamber 1 (1002), and FIG. 10B shows water (1073) in chamber 2 (1003). In an embodiment, each chamber integrates a pump—pump 1 (1004) for chamber 1002 and pump 2 (1005) for chamber 1003—designed for directional water flow through interconnected inflow and outflow conduits (1006 and 1007). A feeding motion is induced by the cyclical fluid transfer between Chamber 1 (1002) and Chamber 2 (1003), which causes the decoy to cyclically pivot from a "resting position" to "feeding position" and back. Wireless remote control cycling or actuation of the pumps (1004 and 1005) is facilitated by a receiver (1008), with power derived from a battery pack (1009) accessible through a cap 1 (1010). Water enters the chamber system through a cap (1011). The battery pack (1009) can be located inside a chamber, accessible by hatch (1012) and cap 2 (1013). The component materials, sizes, and positions can be adjusted to achieve the desired motion. In alternative embodiments the pumps 1004, 1005 can be located within the interior of decoy 1000 but external to chambers 1002, 1003, or can be mounted on the wall of chambers 1002, 1003. In an alternative embodiment, a single pump is used. In another alternative embodiment, the pumps displace water in the chambers with air.

Figure 11A:
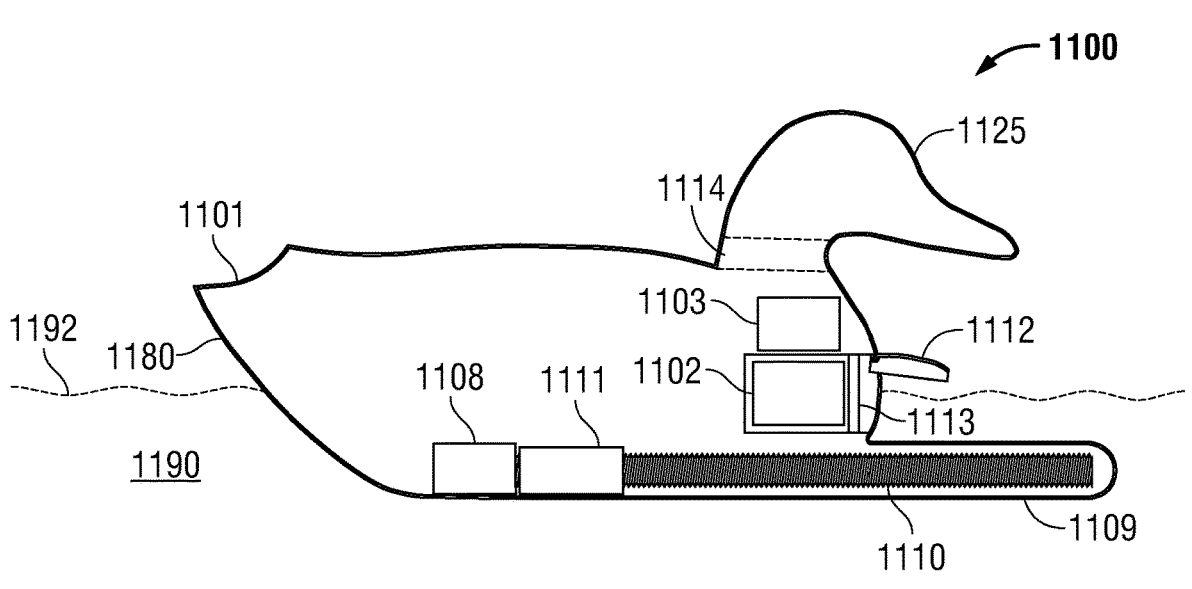
FIGS. 11A and 11B illustrate different perspectives of an alternative embodiment of an internal assembly of an exemplary motion duck decoy.
Figure 11B:
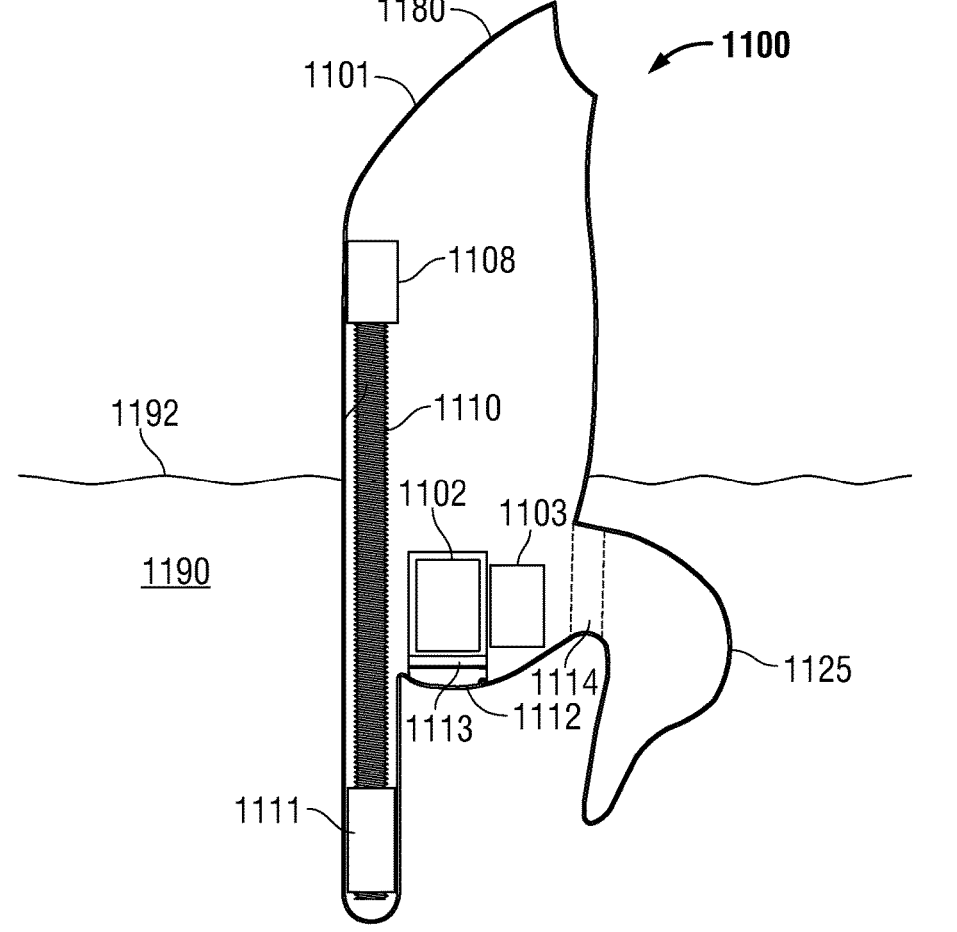

FIGS. 11A and 11B illustrate different perspectives of an alternative embodiment of an internal assembly of an exemplary motion duck decoy. FIG. 11B illustrates a side sectional view of the decoy in a resting position on the surface 1192 of water 1190; FIG. 11B illustrates a side sectional view of the decoy in a feeding position with the head (1125) of the decoy below the surface 1192 of the water and the tail 1180 elevated above the surface 1192 of the water.

The alternative embodiment shown in FIGS. 11A and 11B includes a weight mounted on or coupled or fixed to a ball screw motor to create a duck decoy feeding motion. The duck decoy, taking the form of a detailed plastic shell (1101), accommodates a battery pack (1102) providing power to a ball screw motor (1108). A weight (1111) may be mounted on a threaded shaft or screw (1110), which may be cylindrical. The mounting may include ball bearings or rolling balls (not shown) to enhance or effectuate conversion of the rotational energy of the threaded shaft to linear movement of the weight. The motor regulates the movement of a weight (1111) along threaded shaft (1110) traversing through an adjustable-length bulbous bow (1109). This motion induces cyclic shifts between a lifelike "resting" and "feeding" position, simulating authentic duck behavior. An air gap (1104) within the neck region facilitates water passage for natural head submersion using one or more ports for air or water (not shown). The motion of the ball screw motor (1108) may be driven by the wireless remote's signal to the receiver (1103), cycling or actuating the battery pack (1102) to drive the motor (1108). An air gap (1114) within the head region allows water passage using one or more ports for air or water (not shown), aiding in the submersion of the head during the feeding motion. This embodiment offers versatility in battery pack (1102) and receiver (1103) placement while upholding the essence of the duck decoy's authentic and adjustable simulation of natural duck actions, including the option to adjust the length of the threaded track (1110) and bulbous bow (1109). The battery pack (1102) can be located inside a chamber, accessible by hatch (1112) and cap (1113). Key access points, including waterproof cap (1113) and an access hatch (1112), ease battery pack retrieval while accommodating potential variations in component placement without compromising operational dynamics.

Figure 12A:
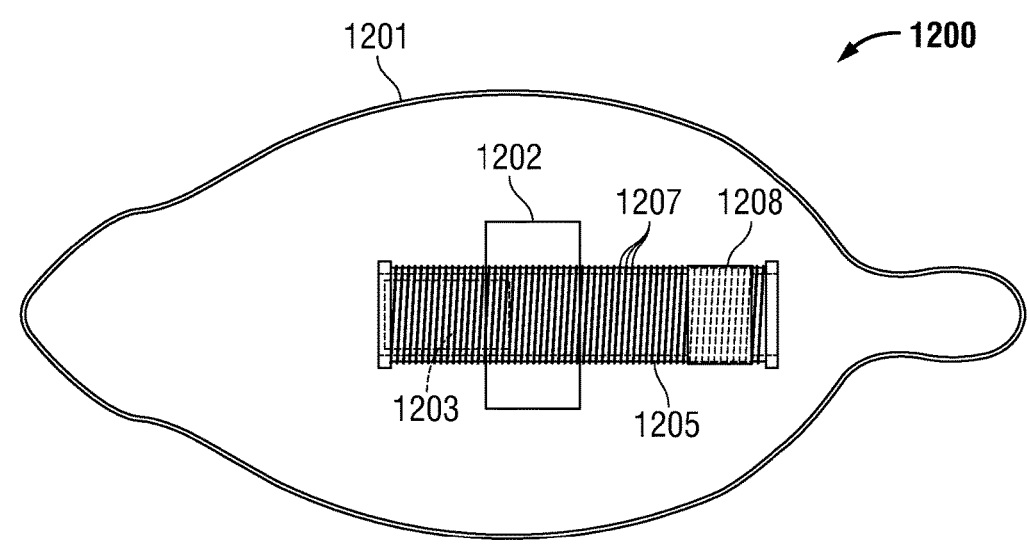
FIGS. 12A, 12B, and 12C illustrate different perspectives of an alternative embodiment of an internal assembly of an exemplary motion duck decoy.
Figure 12B:
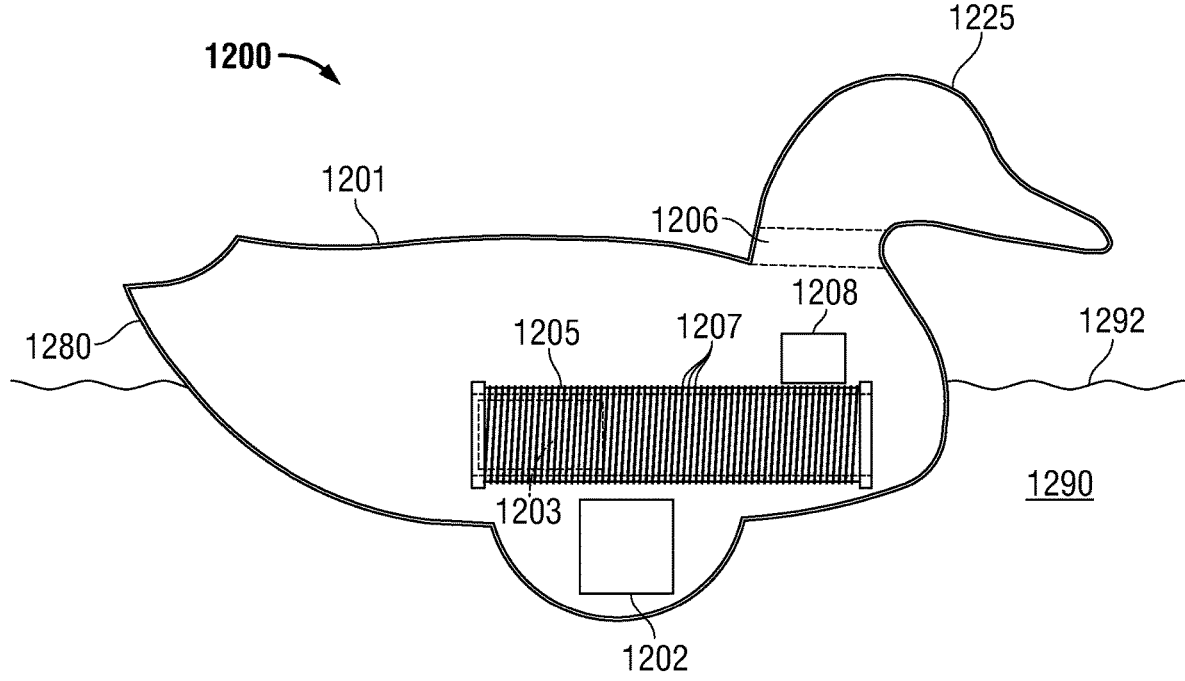
Figure 12C:
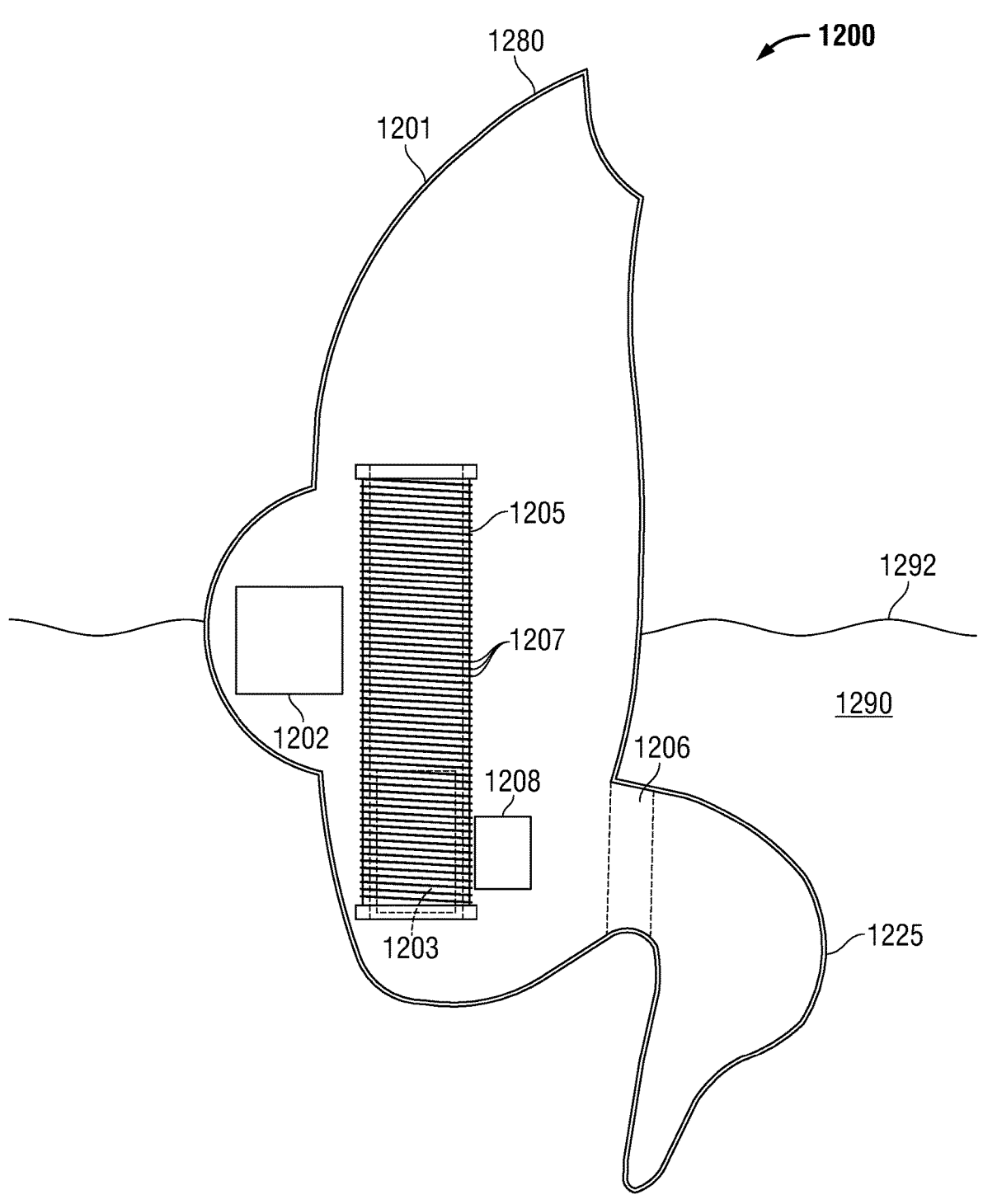

FIGS. 12A, 12B, and 12C illustrate different perspectives of an alternative embodiment of an internal assembly of an exemplary motion duck decoy. FIG. 12A illustrates a sectional view from above; FIG. 12B illustrates a side sectional view of the decoy in a resting position on the surface 1292 of water 1290; FIG. 12C illustrates a side sectional view of the decoy in a feeding position with the head (1225) of the decoy below the surface 1292 of the water and the tail 1280 elevated above the surface 1292 of the water.

The alternative embodiment shown in FIGS. 12A, 12B, and 12C harness the internal motion of a magnet to induce a feeding motion in the duck decoy. Constituent elements comprise a lifelike decoy shell (1201), a battery pack (1202), a cylindrical magnet (1203), a receiver (1204), a cylindrical plastic tube (1205), and an air gap (1206). The magnet (1203) is securely confined within cylindrical tube (1205), which is enveloped by a wire coil (1207), which may include copper wire. Activation of the battery pack (1202) via the receiver (1208) initiates the charging of the wire coil (1207), thereby generating a magnetic field around the plastic tube (1205). This magnetic field precipitates a reciprocating motion of the magnet (1203) within the tube, resulting in a buoyancy shift in the decoy due to the movement and mass of the magnet. The introduction of an adjustable air gap (1206) in the duck's neck facilitates controlled water ingress using one or more ports for air or water (not shown), thereby promoting the submersion of the head during the simulated feeding motion. Dimensional and positional aspects of the magnet (1203), plastic tube (1205), receiver (1208), air gap (1206), and copper wire coil (1207) can be customized to realize the desired feeding motion, and the placement of various components is modifiable to achieve optimal performance.

The embodiments of a motion duck decoy described herein are more lifelike in comparison to other decoys; they create disruptions on the water's surface, mimic the appearance of a living duck, and incorporate the battery, motor and weight into and inside of a self-contained decoy.

Embodiments are intended to be used in waterfowl hunting and conservation practices to attract living ducks and other waterfowl. Suitable for any open body of water-ponds, lakes, coastline, marsh, flooded timber-embodiments of the motion duck decoy may be placed either alone or amongst other motion and static decoys in a spread to draw the attention of living ducks. An exemplary application would be when duck hunting on a lake. Embodiments may be used with other decoys, for example, a spinning wing decoy and two dozen static decoys, to add a life like motion to the decoy spread.

The advantages of the embodiments described herein include easy deployment, lifelike feeding motion, easy operation, and realistic appearance. Because the weight, and battery pack are contained within the decoy, deployment is very simple. The advantage of the feeding motion is the duck head and body of the decoy move in a similar fashion to that of a living duck. Lifelike textures and paint colors may be used to realistically mimic the appearance of a live feeding duck.

In an embodiment, a duck decoy creates the feeding motion of a duck with the weight, battery pack, and motor mechanism all enclosed in the decoy (one unit).

In an embodiment, a duck decoy utilizes an internal Scottish yoke motor mechanism to mimic the feeding motion of a duck.

In an embodiment, a full body motion duck decoy mimics the tail-up feeding motion of a living duck, with the battery, motor, and weight all internally housed inside the decoy.

In an embodiment, a duck decoy mimics the tail-up feeding motion of a living duck using a creatively designed shell geometry and motor-powered internal mass-movement.

Other solutions do not effectively or realistically mimic the natural and realistic tail-up feeding motion of living ducks.

In an embodiment, a duck decoy uses a full body shell design that is optimally configured to create the tail-up feeding motion between the resting and feeding position with the battery, motor, and weight internally housed.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A motion duck decoy, comprising:
a duck decoy comprising a weight, a motor, and a power source enclosed within the duck decoy, and a Scotch yoke mechanism coupled to the motor and adapted and configured to move the weight within the decoy, whereby powered motion of the weight within the duck decoy causes the duck decoy to mimic the feeding motion of a duck.

2. The motion duck decoy of claim 1, wherein causing the duck decoy to mimic the feeding motion of a duck comprises causing the duck decoy to change position from a resting duck position to a duck feeding position.

3. The motion duck decoy of claim 2, wherein the duck decoy comprises a duck head and a duck tail section, and in the resting position the duck decoy floats on a surface of water with the duck head out of water, and in the duck feeding position, the duck head is submerged and the duck tail section is elevated above the surface of the water.

4. The motion duck decoy of claim 2, wherein causing the duck decoy to mimic the feeding motion of a duck further comprises cycling the duck decoy between the resting duck position and the duck feeding position.

5. The motion duck decoy of claim 2, wherein elevating the duck tail section above the surface of the water in the duck feeding position comprises revealing a light-colored area of the underside of the decoy.

6. The motion duck decoy of claim 1, further comprising a wheel coupled to the motor and a sliding yoke coupled to the wheel and to the weight, whereby the sliding yoke is adapted and configured to convert rotational motion of the wheel into linear motion of the weight.

7. The motion duck decoy of claim 1, further comprising a wireless communications receiver adapted and configured to receive control instructions from a remote controller.

8. The motion duck decoy of claim 1, wherein the powered motion of the weight comprises moving the weight to a location within the duck decoy forward of a center of gravity of the duck decoy in a resting position.

9. The motion duck decoy of claim 1, wherein the powered motion of the weight comprises moving the weight linearly along a longitudinal axis of the duck decoy.

10. A motion duck decoy, comprising:
a duck decoy, and disposed within said duck decoy, a weight and means for moving the weight within the decoy to cause the duck decoy to rotate from a resting duck position to a duck feeding position to mimic the feeding motion of a duck,
wherein the duck decoy further comprises a decoy shell, the shell including an underside shell surface having a rounded shape comprising the form of a half-cylinder, whereby the rounded shape assists rotation of the duck decoy from the resting duck position to the duck feeding position.

* * * * *